(12) United States Patent
Myung

(10) Patent No.: US 11,652,258 B2
(45) Date of Patent: May 16, 2023

(54) BATTERY PACK

(71) Applicant: LG ENERGY SOLUTION, LTD., Seoul (KR)

(72) Inventor: Eui Hoon Myung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/954,700

(22) Filed: Sep. 28, 2022

(65) Prior Publication Data

US 2023/0088261 A1 Mar. 23, 2023

Related U.S. Application Data

(62) Division of application No. 17/040,183, filed as application No. PCT/KR2019/015855 on Nov. 19, 2019, now Pat. No. 11,502,368.

(30) Foreign Application Priority Data

Nov. 21, 2018 (KR) ........................ 10-2018-0144863

(51) Int. Cl.
*H01M 10/42* (2006.01)
*H01M 50/30* (2021.01)
*H01M 50/256* (2021.01)
*H01M 10/48* (2006.01)
*H01M 50/202* (2021.01)

(52) U.S. Cl.
CPC ......... *H01M 50/30* (2021.01); *H01M 10/425* (2013.01); *H01M 10/48* (2013.01); *H01M 50/202* (2021.01); *H01M 50/256* (2021.01)

(58) Field of Classification Search
CPC combination set(s) only.
See application file for complete search history.

(56) References Cited

U.S. PATENT DOCUMENTS 2,143,340 A * 1/1939 Willits ................ H01M 50/627
137/557
2,288,984 A 7/1942 Willits
5,329,872 A 7/1994 Wright
(Continued)

FOREIGN PATENT DOCUMENTS

CN 104505482 A 4/2015
JP 2009-43592 A 2/2009
(Continued)

OTHER PUBLICATIONS

Extended European Search Report for European Application No. 19888162.5, dated Apr. 28, 2021.
(Continued)

*Primary Examiner* — Amanda J Barrow
(74) *Attorney, Agent, or Firm* — Birch, Stewart, Kolasch & Birch, LLP

(57) ABSTRACT

A battery pack includes a battery cell and a casing configured to receive the battery cell. The casing has a vent hole configured to allow gas generated in the battery cell to be discharged therethrough, and a sound generator installed in the vent hole so as to block the vent hole. The sound generator is configured to allow the gas to pass therethrough, and generate a sound by the flow of the gas when the gas is discharged from the casing through the vent hole.

6 Claims, 5 Drawing Sheets

(56) References Cited

U.S. PATENT DOCUMENTS

| | | | |
|---|---|---|---|
| 7,201,996 B1 | 4/2007 | Watanabe | |
| 2012/0263982 A1 | 10/2012 | Yasui et al. | |
| 2013/0291784 A1 | 11/2013 | Graber | |
| 2016/0308182 A1 | 10/2016 | Kim | |
| 2021/0210805 A1* | 7/2021 | Czyrka | ............... H01M 10/482 |

FOREIGN PATENT DOCUMENTS

| | | | | |
|---|---|---|---|---|
| JP | 2014-192092 A | 10/2014 | | |
| JP | 2014-232856 A | 12/2014 | | |
| JP | 2016-25073 A | 2/2016 | | |
| KR | 10-2011-012622 | * 11/2011 | ............... F24C 3/12 | |
| KR | 10-2011-0126222 A | 11/2011 | | |
| KR | 10-1388621 B1 | 4/2014 | | |
| KR | 10-2016-0109513 A | 9/2016 | | |
| KR | 10-2016-0113888 A | 10/2016 | | |
| KR | 10-2016-0123816 A | 10/2016 | | |
| KR | 10-2017-0051067 A | 5/2017 | | |
| KR | 10-1794850 B1 | 11/2017 | | |
| WO | WO 2012/073438 A1 | 6/2012 | | |

OTHER PUBLICATIONS

International Search Report issued in PCT/KR2019/015855 (PCT/ISA/210), dated Mar. 3, 2020.

* cited by examiner

[FIG. 1]
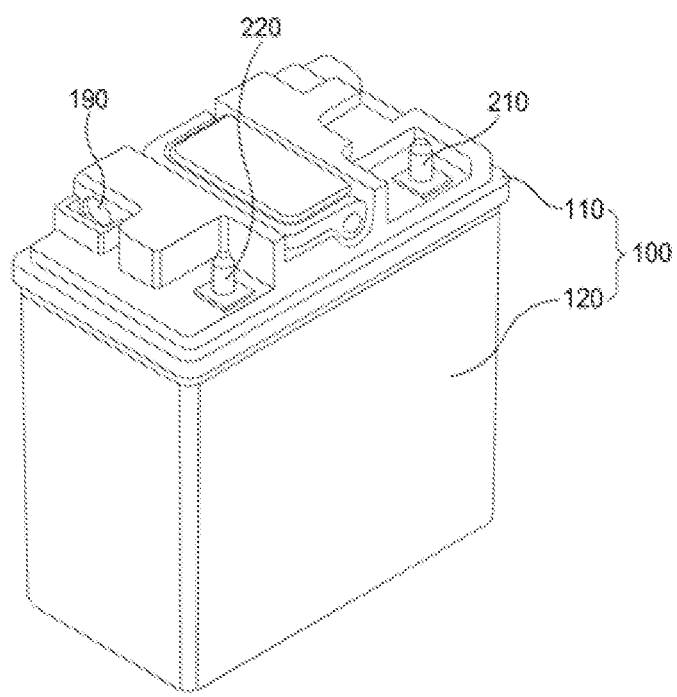

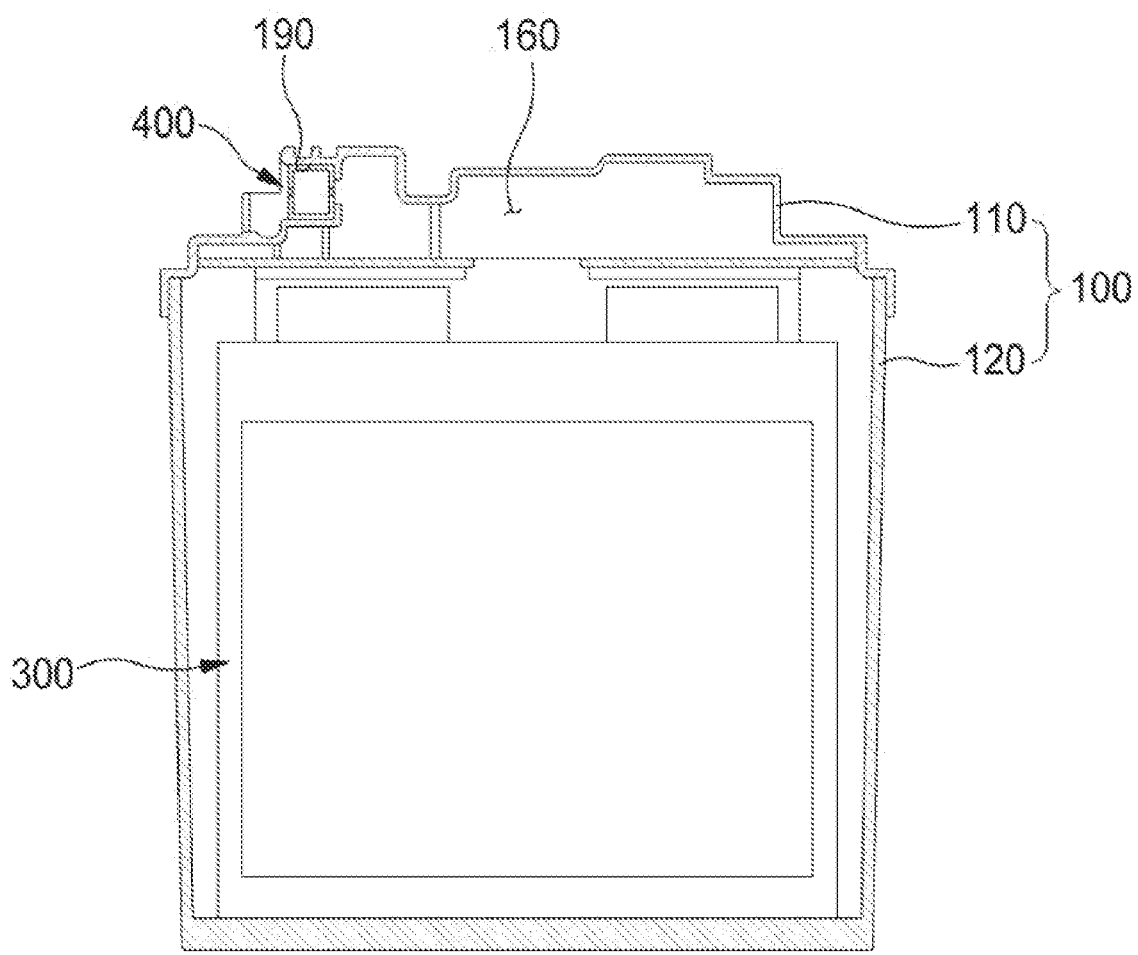

[FIG. 3]
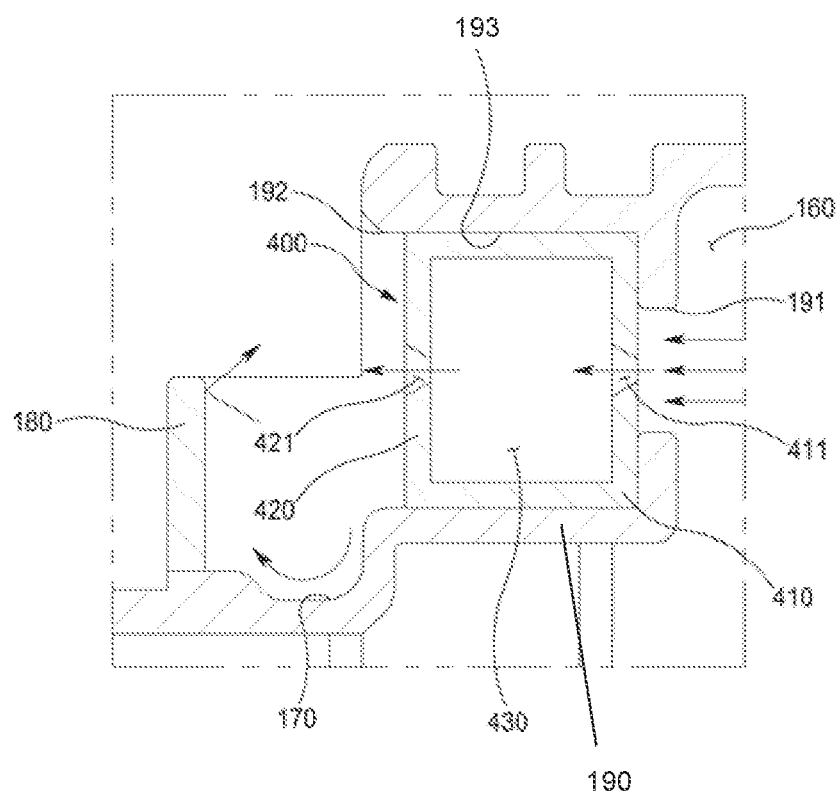

[FIG. 4]
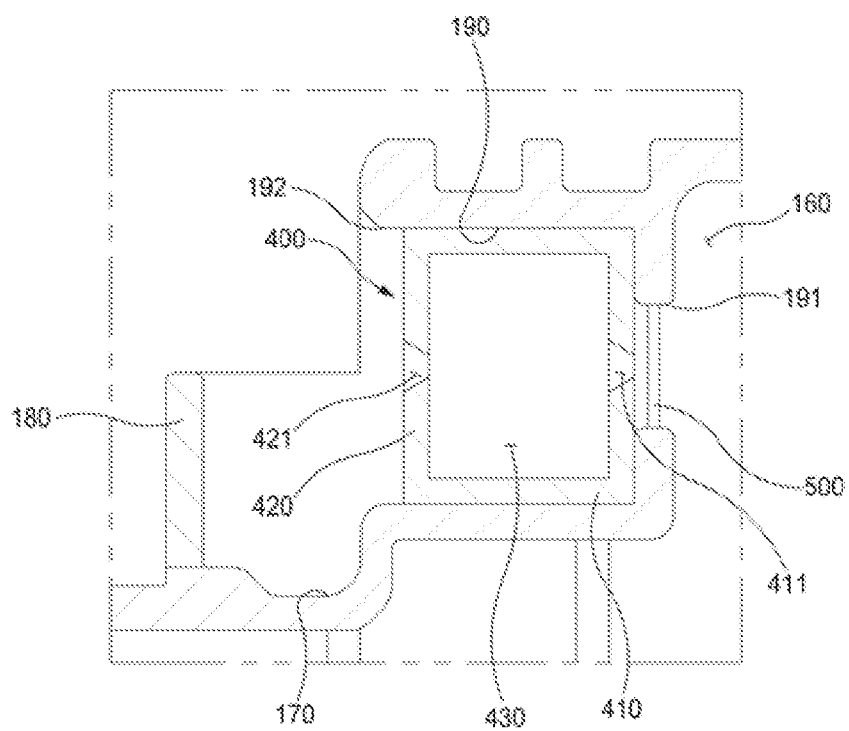

[FIG. 5]
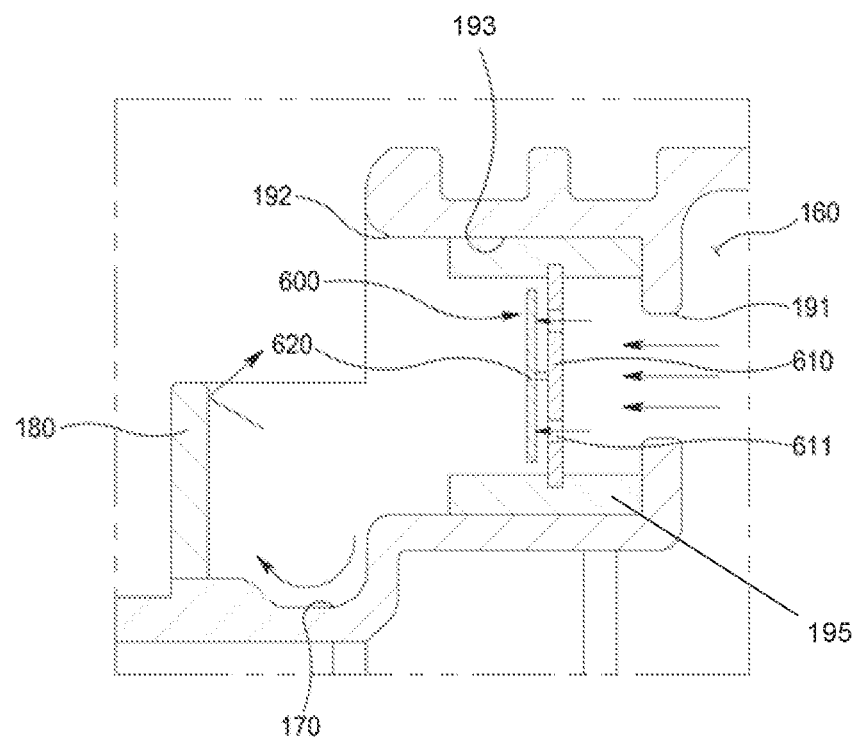

BATTERY PACK

CROSS REFERENCE TO RELATED APPLICATIONS

This application is a Divisional Application of U.S. application Ser. No. 17/040,183, filed Sep. 22, 2020, which is the National Phase Application of PCT/KR2019/015855, filed Nov. 19, 2019, which claims benefit under 35 USC § 119 to KR 10-2018-0144863, filed Nov. 21, 2018, the content of all of which are incorporated by reference.

TECHNICAL FIELD

The present invention relates to a battery pack.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in medium- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor. The battery pack includes a battery module including a plurality of battery cells, wherein the plurality of battery cells is connected to each other in series and/or in parallel, whereby the capacity and output of the battery module are increased.

Basically, a battery cell is manufactured through a process of stacking a plurality of electrode plates in the state in which a separator is disposed therebetween and welding a plurality of electrode tabs to the plurality of electrode plates, respectively, to form an electrode assembly and wrapping the electrode assembly in an aluminum pouch so as to be sealed.

During the use of the battery pack, gas may be generated in the battery cell. The gas may be generated due to the decomposition of an electrolyte when the lifespan of the battery cell expires, the battery cell is exposed to high temperature, the battery cell is overcharged, or short circuit occurs in the battery cell. The pouch of the battery cell generally has a gas discharge structure configured to prevent the occurrence of a safety-related accident due to the gas generated as described above.

However, a conventional battery pack does not have a construction that is capable of immediately confirming the generation of gas in a battery cell. Therefore, there is a need for a construction capable of enabling a user to immediately confirm the generation of gas in the case in which the gas is generated in the battery cell such that the user can take a measure, such as exchange of the battery pack.

DISCLOSURE

Technical Problem

The present invention has been made in view of the above problems, and it is an object of the present invention to provide a battery pack capable of enabling a user to immediately confirm the generation of gas in a battery cell.

Technical Solution

A battery pack according to an embodiment of the present invention provided to accomplish the above object may include a battery cell, a casing configured to receive the battery cell, the casing having formed therein a vent chamber configured to allow gas generated in the battery cell to be discharged therethrough, and a sound generator installed in the vent chamber so as to block the vent chamber, the sound generator being configured to allow the gas to pass therethrough, the sound generator being configured to generate a sound by the flow of the gas when the gas is discharged from the casing through the vent chamber.

The sound generator may include a first portion having at least one first orifice formed at an inlet side of the vent chamber and a second portion disposed so as to be spaced apart from the first portion, a gas diffusion space being formed between the first portion and the second portion, the second portion having at least one second orifice formed at an outlet side of the vent chamber, The sound generator may include a partition wall disposed at the inlet side of the vent chamber, the partition wall having at least one gas passage hole formed therein, and a vibration plate supported by the partition wall, the vibration plate being configured to be vibrated by the flow of gas that has passed through the gas passage hole in order to generate a sound.

A collision wall provided at an outlet side of the vent chamber and configured to allow a sound wave of the sound generated by the sound generator to collide therewith.

A concave portion configured to reflect a sound wave of the sound generated by the sound generator may be provided at the outlet side of the vent chamber.

A moisture blocking membrane may be installed at the inlet side of the vent chamber so as to block the inlet, the moisture blocking membrane being configured to allow the flow of gas into the vent chamber and to block the introduction of moisture into the casing.

The casing may include an upper housing and a lower housing, the vent chamber may be formed in the upper housing, and the battery cell may be received in the lower housing.

The upper housing may have a gas capture space formed therein, the gas capture space being configured to communicate with the vent chamber and to capture the gas.

DESCRIPTION OF DRAWINGS

The following drawings appended to this specification are provided to illustrate preferred embodiments of the present invention and to aid in understanding the technical idea of the present invention together with the detailed description of the invention, a description of which will follow, and the present invention should not be interpreted as being limited only to matters described in the drawings.

FIG. 1 is a perspective view schematically showing a battery pack according to a first embodiment of the present invention.

FIG. 2 is a sectional view schematically showing the battery pack according to the first embodiment of the present invention.

FIG. 3 is a sectional view schematically showing a sound generator of the battery pack according to the first embodiment of the present invention and the flow of gas passing through the sound generator.

FIG. 4 is a sectional view schematically showing a sound generator and a moisture blocking membrane of a battery pack according to a second embodiment of the present invention.

FIG. 5 is a sectional view schematically showing a sound generator of a battery pack according to a third embodiment of the present invention and the flow of gas passing through the sound generator.

BEST MODE

Embodiments of the present invention are provided in order to more completely describe the present invention to a person having ordinary skill in the art, and therefore the shape and size of each element in the drawings may be exaggerated, omitted, or schematically illustrated for clearer description. Consequently, the size or rate of each element does not entirely reflect the actual size or rate thereof.

Hereinafter, the preferred embodiments of the present invention will be described in detail with reference to the accompanying drawings. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method.

FIG. 1 is a perspective view schematically showing a battery pack according to a first embodiment of the present invention, and FIG. 2 is a sectional view schematically showing the battery pack according to the first embodiment of the present invention.

As shown in FIGS. 1 and 2, the battery pack according to the first embodiment of the present invention includes a casing 100 having an inner space, electrode terminals 210 and 220 exposed outside through through-holes (not shown) formed in the casing 100, and a battery module disposed in the casing 100, the battery module having a plurality of battery cells 300.

As shown in FIG. 1, the electrode terminals 210 and 220 may be configured so as to be exposed upwards in FIG. 1.

As shown in FIG. 1, the casing 100 may have the shape of an approximately rectangular parallelepiped; however, the present invention is not limited as to the shape of the casing 100. The casing 100 serves to protect the battery cells 300 from external force. The casing 100 includes an upper housing 110 and a lower housing 120. The upper housing 110 and the lower housing 120 are coupled to each other such that the inner space, which is configured to receive the battery cells 300, is formed in the casing 100.

Each of the upper housing 110 and the lower housing 120 may be made of plastic. In this case, the upper housing 110 and the lower housing 120 may be joined to each other by welding. As a result, the interior of the casing 100 may have a dustproof and waterproof structure. However, the present invention is not limited as to the material of each of the upper housing 110 and the lower housing 120. In addition, the upper housing 110 and the lower housing 120 may be coupled to each other by any of various fastening means, such as bolting and riveting, in place of welding.

The plurality of battery cells 300 may be received in the lower housing 120. For example, each of the battery cells 300 may be a pouch-shaped battery cell, and the pouch-shaped battery cell may include an electrode assembly configured by stacking a plurality of electrode plates in the state in which a separator is disposed therebetween and a pouch configured to wrap the electrode assembly. The lower housing 120 may have a battery cell receiving space having a width and a height corresponding respectively to the width and the length of each of the battery cells 300.

A vent chamber 190 configured to allow gas generated in the battery cells 300 to be discharged therethrough may be formed in the tipper housing 110. The vent chamber 190 has an inlet 191 configured to allow gas to be introduced therethrough and an outlet 192 configured to allow gas to be discharged therethrough and an inner surface 193. Consequently, gas generated in the battery cells 300 due to problems with the battery cells 300 may flow from the lower housing 120 to the upper housing 110, and may be discharged outside through the vent chamber 190 of the upper housing 110 under a predetermined pressure.

Meanwhile, the upper housing 110 may have a gas capture space 160 configured to communicate with the vent chamber 190. Gas generated in the battery cells 300 may be captured in the gas capture space 160. When the pressure of the gas captured in the gas capture space 160 reaches the predetermined pressure, therefore, the gas may be discharged outside through the vent chamber 190.

As an example, the gas capture space 160 may be located at the middle of the upper part of the casing 100 or may be located at a position biased to one side from a vertical central axis of the casing 100. Consequently, the gas generated in the battery cells 300 may directly flow to the gas capture space 160 located at the middle of the upper part of the casing 100 (the middle of the upper housing 110). In addition, the gas that has flowed to the gas capture space 160 may directly flow toward the vent chamber 190.

The battery pack according to the first embodiment of the present invention may include a sound generator 400 configured to generate a sound such that, in the case in which gas is generated in the battery cells 300, a user can immediately confirm the same.

Hereinafter, the sound generator 400 of the battery pack according to the first embodiment of the present invention will be described with reference to FIG. 3. FIG. 3 is a sectional view schematically showing the sound generator of the battery pack according to the first embodiment of the present invention and the flow of gas passing through the sound generator.

As shown in FIG. 3, the sound generator 400 may be mounted in the vent chamber 190 of the casing 100 of the battery pack. The sound generator 400 is between the inlet 191 and outlet 192 and the sound generator contacts the inner surface of the chamber and extends between the inlet 191 and outlet 192.

As an example, the sound generator 400 may be configured as a single module, and may be inserted and fitted into the interior of the vent chamber 190 of the casing 100. The sound generator 400 may have a size corresponding to the size of the inner space of the vent chamber 190, and therefore the sound generator 400 may be fastened to the interior of the vent chamber 190 in a tight fitting fashion, whereby fastening therebetween may be stably maintained.

Alternatively, the sound generator 400 may be fitted into the interior of the vent chamber 190, and then the sound generator 400 may be stably mounted in the vent chamber 190 by welding, bolting, riveting, an adhesive, etc.

Since the sound generator 400 is configured as a single separate module, the sound generator 400 may be fitted into a vent chamber 190 of a battery pack having a conventional structure, and may be used in this state. Consequently, the sound generator 400 may be easily applied to a battery pack having a conventional structure. In this case, a space having a sufficient size to allow the sound generator 400 to pass toward the vent chamber 190 may be secured at the outlet 192 side of the vent chamber 190.

However, the present invention is not limited to the construction in which the sound generator 400 is configured as a separate module. As another example, the sound generator 400 may be formed integrally with the casing 100. For example, the sound generator 400 may be formed integrally with the casing 100 through injection molding, insert injection molding, etc.

The sound generator 400 is installed in the vent chamber 190 so as to block the vent chamber 190, and is configured to allow gas to pass therethrough. In the process in which gas introduced through the inlet 191 of the vent chamber 190 is discharged through the outlet 192 of the vent chamber 190, therefore, the gas generates a sound when passing through the sound generator 400.

The sound generator 400 may include a first portion 410 having a first orifice 411 formed at the inlet 191 side of the vent chamber 190 and a second portion 420 disposed so as to be spaced apart from the first portion 410, a gas diffusion space 430 being formed between the first portion 410 and the second portion 420, the second portion 420 having a second orifice 421 formed at the outlet 192 side of the vent chamber 190.

Depending on circumstances, the first portion 410 may have a plurality of first orifices 411. The plurality of first orifices 411 may be disposed about the center of the inlet 191 of the vent chamber 190 at regular intervals in the circumferential direction thereof. In the same manner, the second portion 420 may have a plurality of second orifices 421. The plurality of second orifices 421 may be disposed about the center of the outlet 192 of the vent chamber 190 at regular intervals in the circumferential direction thereof.

In order to effectively generate a swirl of gas, the inner diameter of the first orifice 411 may be gradually increased from the inlet 191 of the vent chamber 190 in a direction toward the gas diffusion space 430. However, the present invention is not limited to this construction, and the first orifice 411 may have a uniform inner diameter. In the same manner, in order to effectively generate a swirl of gas, the inner diameter of the second orifice 421 may be gradually increased from the gas diffusion space 430 in a direction toward the outlet 192 of the vent chamber 190. However, the present invention is not limited to this construction, and the second orifice 421 may have a uniform inner diameter.

According to this construction, gas introduced through the inlet 191 of the vent chamber 190 pushes the first portion 410 of the sound generator 400, whereby pressure of the gas increases.

When the pressure of the gas introduced through the inlet 191 of the vent chamber 190 reaches a predetermined pressure, some of the gas that pushes the first portion 410 passes through the first orifice 411 and is then ejected into the gas diffusion space 430.

At this time, the gas ejected into the gas diffusion space 430 generates a swirl while flowing very unstable. In addition, the gas ejected into the gas diffusion space 430 collides with the second portion 420. Consequently, a sound wave is generated due to the swirl of the gas and the collision of the gas with the second portion 420.

In addition, some of the gas in the gas diffusion space 430 generates a swirl when passing through the second orifice 421 of the second portion 420 and being ejected outside, and a sound wave is generated due to this swirl.

The sound wave generated by ejection of the gas as described above is transmitted to a user, whereby it is possible for the user to immediately confirm the situation in which the gas is ejected through the outlet 192 of the vent chamber 190.

Meanwhile, a collision wall 180 installed at a position of the upper housing so as to be spaced apart from outlet of the vent chamber and the sound generator 400 and configured to allow the sound wave of the sound generated by the sound generator 400 to collide therewith may be provided at the outlet 192 side of the vent chamber 190. The collision wall 180 may serve to reflect the sound wave toward a position at which the user is capable of clearly hearing the sound.

The collision wall 180 may be formed in the tipper housing 110 at a position adjacent to the outlet 192 side of the vent chamber 190. As seen in FIG. 4, the collision wall is parallel to the second portion having the second orifice 421. However, the present invention is not limited to this construction, and the collision wall 180 may be formed integrally with the sound generator 400. Consequently, the sound generator 400 may be configured as a single module including the collision wall 180, and may be mounted in the vent chamber 190.

In addition, a concave portion 170 configured to reflect the sound wave of the sound generated by the sound generator 400 may be further provided at the outlet 192 side of the vent chamber 190. The concave portion in formed in a portion of the upper housing extending from a first position of the tipper housing having the outlet 192 of the vent chamber and a second position of the upper housing having the collision wall 180. In the same manner as the collision wall 180, the concave portion 170 may serve to reflect the sound wave toward a position at which the user is capable of clearly hearing the sound.

The concave portion 170 may have a curved surface formed to induce smooth reflection of the sound wave discharged through the outlet 192 of the vent chamber 190. In addition, the curved surface of the concave portion 170 may be curved toward the collision wall 180. Meanwhile, the collision wall 180, the concave portion 170, the outlet 192 of the vent chamber 190, and the second portion 420 of the sound generator 400 form a space having the shape of a predetermined bowl thereamong. This space may serve to reflect the sound wave toward a position at which the user is capable of clearly hearing the sound.

The concave portion 170 may be formed in the upper housing 110 at a position adjacent to the outlet 192 side of the vent chamber 190. However, the present invention is not limited to this construction, and the concave portion 170 may be formed integrally with the sound generator 400. Consequently, the sound generator 400 may be configured as a single module including the concave portion 170, and may be mounted in the vent chamber 190.

The battery pack according to the first embodiment of the present invention includes the sound generator 400, which is configured to generate a sound by the flow of gas generated in the battery cells 300. In the case in which gas is generated in the battery cells 300, therefore, it is possible for the user to immediately confirm the same.

In addition, according to the first embodiment of the present invention, the sound generator 400 of the battery pack is configured to generate a sound only by the flow of gas. Consequently, it is possible for the user to confirm the generation of gas without additional electric power or power or without a separate sensor.

Hereinafter, a battery pack according to a second embodiment of the present invention will be described with reference to FIG. 4. Components identical to the components of the first embodiment of the present invention are denoted by the same reference numerals, and a detailed description thereof will be omitted.

FIG. 4 is a sectional view schematically showing a sound generator and a moisture blocking membrane of a battery pack according to a second embodiment of the present invention.

As shown in FIG. 4, the battery pack according to the second embodiment of the present invention may have a moisture blocking membrane 500 installed at an inlet 191 side of a vent chamber 190 so as to block the inlet 191 and configured to allow the flow of gas into the vent chamber 190 and to block the introduction of moisture into a casing 100.

The moisture blocking membrane 500 is located between a gas capture space 160 and the vent chamber 190 to partition the gas capture space 160 and the vent chamber 190 from each other. The moisture blocking membrane 500 may be fixedly coupled to the inlet 191 of the vent chamber 190 through various fastening means, such as welding, bolting, riveting, and an adhesive.

The moisture blocking membrane 500 is configured to allow gas having a predetermined pressure to pass therethrough. When the pressure of gas captured in the gas capture space 160 reaches the predetermined pressure, therefore, the gas present in the gas capture space 160 may flow into the vent chamber 190 through the moisture blocking membrane 500, and may generate a sound while passing through a sound generator 400.

In the battery pack according to the second embodiment of the present invention, the moisture blocking membrane 500 is provided between the gas capture space 160 and the vent chamber 190, whereby it is possible to prevent moisture from being introduced into the casing 100. In addition, the gas may be discharged outside through the vent chamber 190 only when the pressure of the gas in the casing 100 reaches the predetermined pressure.

Hereinafter, a battery pack according to a third embodiment of the present invention will be described with reference to FIG. 5. Components identical to the components of the first and second embodiments of the present invention are denoted by the same reference numerals, and a detailed description thereof will be omitted.

FIG. 5 is a sectional view schematically showing a sound generator of a battery pack according to a third embodiment of the present invention and the flow of gas passing through the sound generator.

As shown in FIG. 5, the battery pack according to the third embodiment of the present invention may include a sound generator 600, and the sound generator 600 may include a partition wall 610 disposed at an inlet 191 side of a vent chamber 190, the partition wall 610 having a gas passage hole 611 formed therein, and a vibration plate 620 supported by the partition wall 610, the vibration plate 620 being configured to be vibrated by the flow of gas that has passed through the gas passage hole 611 in order to generate a sound. The inlet 191 and outlet 192 of the vent chamber are spaced from one another in a first direction. The partition wall 610 and vibration plate have a width in a second direction different than the first direction. The width of the vibration plate 620 is less than a width of the partition wall 610. The edges of the partition wall are retained by a support 195 fitting against the inner surface 193 of the vent chamber. The edges of the vibration plate 620 are spaced from the support 195.

As an example, the sound generator 600 may be configured as a single module, and may be inserted and fitted into the interior of the vent chamber 190, which is formed in a casing 100. The sound generator 600 may have a size corresponding to the size of an inner space of the vent chamber 190, and therefore the sound generator 600 may be fastened to the interior of the vent chamber 190 in a tight fitting fashion, whereby fastening therebetween may be stably maintained.

Alternatively, the sound generator 600 may be fitted into the interior of the vent chamber 190, and then the sound generator 600 may be stably mounted in the vent chamber 190 by welding, bolting, riveting, an adhesive, etc.

Since the sound generator 600 is configured as a single separate module, the sound generator 600 may be fitted into a vent chamber 190 of a battery pack having a conventional structure, and may be used in this state. Consequently, the sound generator 600 may be easily applied to a battery pack having a conventional structure. In this case, a space having a sufficient size to allow the sound generator 600 to pass toward the vent chamber 190 may be secured at an outlet 192 side of the vent chamber 190.

However, the present invention is not limited to the construction in which the sound generator 600 is configured as a separate module. As another example, the sound generator 600 may be formed integrally with the casing 100. For example, the sound generator 600 may be formed integrally with the casing 100 through injection molding, insert injection molding, etc.

The partition wall 610 may have a plurality of gas passage holes 611. The plurality of gas passage holes 611 may be disposed at regular intervals in the circumferential direction of the vibration plate 620.

The vibration plate 620 may be made of plastic or metal that exhibits predetermined flexibility. The center of the vibration plate 620 may be fixed to the center of the partition wall 610 via a connection member having the shape of a predetermined bar.

According to this construction, gas introduced through the inlet 191 of the vent chamber 190 pushes the partition wall 610 of the sound generator 600, whereby pressure of the gas increases. At this time, some of the gas that pushes the partition wall 610 passes through the gas passage holes 611, and is then ejected toward the vibration plate 620. As a result, the vibration plate 620 may be vibrated by the ejected gas, and may vibrate ambient air to generate a sound wave.

According to the third embodiment of the present invention, the sound generator 600 of the battery pack is configured to generate a sound only by the flow of gas. Consequently, it is possible for the user to confirm the generation of gas without additional electric power or power or without a separate sensor.

The battery pack according to the embodiment of the present invention may be applied to a device including the battery pack as a power source.

For example, the device may be a computer, a cellular phone, a wearable electronic device, a power tool, an electric vehicle (EV), a hybrid electric vehicle, a plug-in hybrid electric vehicle, an electric two-wheeled vehicle, an electric golf cart, or an energy storage apparatus. The energy storage apparatus may be applied to various fields or places, such as a smart-grid system configured to control the supply and demand of electric power or a charging station for electric vehicles.

The preferred embodiments of the present invention have been described illustratively; however, the scope of the present invention is not limited to such specific embodiments, and may be appropriately changed within the category described in the claims.

DESCRIPTION OF REFERENCE NUMERALS

100: Casing
300: Battery cells
400: Sound generator
500: Moisture blocking membrane
600: Sound generator

INDUSTRIAL APPLICABILITY

A battery pack according to an embodiment of the present invention includes a sound generator configured to generate a sound by the flow of gas generated in a battery cell. In the case in which gas is generated in the battery cell, therefore, it is possible for a user to immediately confirm the same.

According to the embodiment of the present invention, the sound generator of the battery pack is configured to generate a sound only by the flow of gas. Consequently, it is possible for the user to confirm the generation of gas without additional electric power or power or without a separate sensor.

What is claimed is:

1. A battery pack comprising:
a battery cell;
a casing configured to receive the battery cell, the casing having formed therein a vent chamber configured to allow gas generated in the battery cell to be discharged therethrough, the vent chamber having an inlet and an outlet; and
a sound generator installed in the vent chamber, the sound generator being configured to allow the gas to pass therethrough, the sound generator being configured to generate a sound by flow of the gas when the gas is discharged from the casing through the vent chamber,
wherein the sound generator comprises:
a partition wall, the partition wall having at least one gas passage hole formed therein; and
a vibration plate spaced from the partition wall, the vibration plate being configured to be vibrated by flow of gas that has passed through the at least one gas passage hole in order to generate a sound.

2. The battery pack according to claim 1, wherein the vibration plate is attached to the partition wall by a bar.

3. The battery pack according to claim 1, wherein the vibration plate is made of plastic or metal.

4. The battery pack according to claim 1, wherein a width of the vibration plate is less than a width of the partition wall.

5. The battery pack according to claim 1, wherein the sound generator comprises a support,
wherein an edge of the partition wall is retained by the support.

6. The battery pack according to claim 5, wherein an edge of the vibration plate is spaced from the support.

* * * * *